United States Patent
Vaykole et al.

(10) Patent No.: US 11,308,028 B2
(45) Date of Patent: Apr. 19, 2022

(54) PREDICTING AND DELETING IDLE REMOTE SESSIONS IN A DISTRIBUTED FILE SYSTEM

(71) Applicant: EMC IP Holding Company LLC, Hopkinton, MA (US)

(72) Inventors: Tejas Anil Vaykole, Pune (IN); Pratik Rupala, Gujarat (IN); Kaushik Gupta, Singhbhum (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 170 days.

(21) Appl. No.: 16/725,498

(22) Filed: Dec. 23, 2019

(65) Prior Publication Data

US 2021/0191902 A1    Jun. 24, 2021

(51) Int. Cl.
*G06F 16/10* (2019.01)
*G06F 16/11* (2019.01)
*G06F 16/182* (2019.01)

(52) U.S. Cl.
CPC .......... *G06F 16/122* (2019.01); *G06F 16/182* (2019.01)

(58) Field of Classification Search
None
See application file for complete search history.

(56) References Cited

U.S. PATENT DOCUMENTS

| | | | |
|---|---|---|---|
| 10,007,704 B1* | 6/2018 | Carey | H04L 47/10 |
| 10,257,859 B1* | 4/2019 | Chu | H04W 74/0808 |
| 10,713,080 B1* | 7/2020 | Brooker | G06F 9/45558 |
| 2003/0182285 A1 | 9/2003 | Kuwata et al. | |
| 2009/0106247 A1 | 4/2009 | Daughtry et al. | |
| 2009/0113050 A1 | 4/2009 | Hatanaka | |
| 2009/0228429 A1* | 9/2009 | Diaconu | G06F 16/188 |
| 2015/0200817 A1 | 7/2015 | Mulchandani et al. | |
| 2015/0278397 A1* | 10/2015 | Hendrickson | G06F 16/9024 707/798 |
| 2015/0280959 A1 | 10/2015 | Vincent | |
| 2018/0077243 A1 | 3/2018 | Mathew et al. | |
| 2018/0167454 A1 | 6/2018 | Ambach et al. | |
| 2019/0116160 A1* | 4/2019 | Bhat | G06F 21/6218 |
| 2020/0099753 A1 | 3/2020 | Fleck et al. | |

OTHER PUBLICATIONS

Non-Final Office Action received for U.S. Appl. No. 16/688,183 dated Aug. 7, 2020, 76 pages.
Office Action dated Nov. 22, 2021 for U.S. Appl. No. 16/688,183, 120 pages.
Stirk, Ian W. "SQL Server DMVs in Action", Manning Publication Co., Chapter 8, 2011, 355 pages.

* cited by examiner

*Primary Examiner* — Jau Shya Meng
(74) *Attorney, Agent, or Firm* — Amin, Turocy & Watson, LLP

(57) ABSTRACT

Techniques are provided for predicting and deleting idle remote sessions in a distributed file system. In an example, a server that serves a plurality of server message block (SMB) sessions analyzes with linear regression techniques those sessions to determine which sessions will become idle. In some examples, the server can then proactively close a SMB session that it predicts that an administrator would choose to close after a given idle period of time, or recommend to an administrator that the SMB session can be closed.

20 Claims, 10 Drawing Sheets

| 302 | 304 | 306 |
|---|---|---|
| Idle session ID | Dependent sessions (count) | Idle since (time in minutes) |
| 1 | 1 session | 20 |
| 2 | 2 sessions | 10 |
| 3 | 4 sessions | 5 |
| 4 | 5 sessions | 25 |

$$\underset{502}{\text{minimize}} \frac{1}{n} \underset{i=1}{\overset{n}{\sum}} (\underset{508}{\text{predicted value}}_i - \underset{510}{y_i})^2$$

| SESSION ID 602 | CLOSE SESSION? 604 |
|---|---|
| 1 | YES |
| 2 | NO |
| 3 | NO |

PREDICTING AND DELETING IDLE REMOTE SESSIONS IN A DISTRIBUTED FILE SYSTEM

TECHNICAL FIELD

The present application relates generally to remote sessions with a distributed file system, e.g., predicting and/or deleting idle remote sessions of the remote sessions.

BACKGROUND

In some examples, a distributed file system organizes a plurality of file shares that are distributed across multiple computing nodes of a computer system. A distributed file system can offer a single namespace across the multiple nodes of the computer system and that can be accessed by a computer that has established a remote session with the distributed file system. In some examples, a Server Message Block (SMB, sometimes referred to as Samba) network communication protocol can be utilized in establishing and conducting the remote session. A distributed file system can also offer data redundancy via, for example, replicating a file across multiple computing nodes of a computer system.

BRIEF DESCRIPTION OF THE DRAWINGS

Numerous aspects, embodiments, objects, and advantages of the present invention will be apparent upon consideration of the following detailed description, taken in conjunction with the accompanying drawings, in which like reference characters refer to like parts throughout, and in which:

FIG. 3 illustrates a table that can facilitate predicting and deleting idle remote sessions in a distributed file system, in accordance with certain embodiments of this disclosure;

FIG. 5 illustrates an expression that can facilitate predicting and deleting idle remote sessions in a distributed file system, in accordance with certain embodiments of this disclosure;

FIG. 6 illustrates an example user interface that can facilitate predicting and deleting idle remote sessions in a distributed file system, in accordance with certain embodiments of this disclosure;

DETAILED DESCRIPTION

Overview

Figure 1:
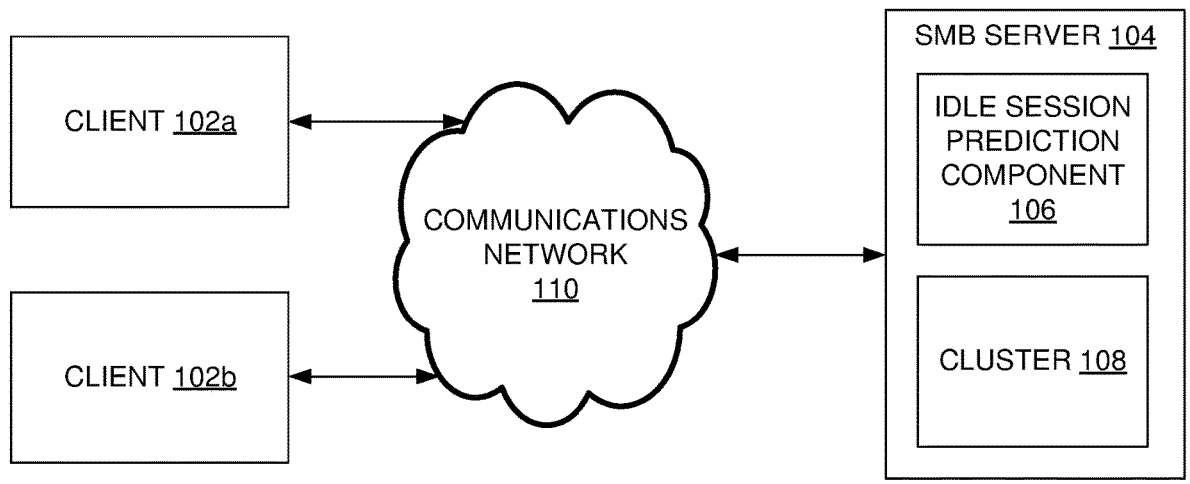
FIG. 1 illustrates a block diagram of an example computer system that can facilitate predicting and deleting idle remote sessions in a distributed file system, in accordance with certain embodiments of this disclosure.

A SMB session can take a lock on network shared files, and then become idle. SMB deals with file locking, preventing file corruption, and data loss when two or more clients try to simultaneously edit the same file. There can be situations where a file unlock must be effectuated manually and by force—for example, when a file was closed but its corresponding lock was not properly released by SMB.

There can be a problem with manually unlocking files, because it is not a scalable approach due to requiring an administrator to perform several operations by hand, including: (a) listing all of the SMB sessions in all of the nodes; (b) identifying the session that is both idle and holding a write lock; and (c) removing that session.

In some examples, a solution to a problem with manually unlocking files involves automating aspects of this process. Such a solution can include: (a) providing a dashboard with all of the information that an administrator needs to decide whether a session should be removed; (b) predicting which session an administrator would close; and (c) closing the idle session on behalf of the administrator.

In some architectures, whenever a SMB request hits a SMB server, a corresponding session is opened for the client Internet Protocol (IP) address for a specific user. User(s) can read from and write to network-attached files using one or more sessions. A SMB server can store information about a session, such as the client IP address, the user, and which files are locked by the session in a database.

When an idle session has locked a file, this information about sessions that is stored by a SMB server can be used to kill the most appropriate SMB process that has an exclusive lock on one or more files, and is an idle session, as well as make predictions about when an administrator would close particular idle sessions.

A SMB server can maintain information about each open SMB session that it is serving. This information about a SMB session can be an active time, an idle time, a number of dependents, a number of open files, a type of locks a SMB session holds, etc. This information, along with earlier user actions made with regard to closing SMB sessions can be used to develop a model to predict SMB sessions that can be closed efficiently. Input for such a prediction model can be parameters like idle time and/or number of dependents for the SMB session, and a time at which the administrator chose to close a particular SMB session.

The output of such a prediction model can be session IDs corresponding to SMB sessions that the prediction model recommends to be closed. These session IDs can correspond to SMB sessions that are distributed across multiple nodes of a computing cluster. A relationship between a time to close an idle session and an idle time of these session can be represented as $$y=a+b(x)$$

where a is an intercept, b is a co-efficient of the function (x), x is a time at which the session is closed, and y is a number of dependent sessions and/or an idle time of a session.

By applying a linear regression model, values for a and b can be determined. Then, by achieving a best-fit regression line, the prediction model can predict a y value such that an error difference between a predicted value and a true value is minimized.

When a user lists idle SMB sessions on a computing cluster, the prediction model can run per session information and list the sessions in a precedence order in which they are recommended to be closed. Depending on resulting user actions regarding a listed session, actions can be captured and fed to the prediction model to re-determine an intercept and co-efficient. In some examples, where the prediction model has been trained enough, then the SMB server itself can make decisions to close SMB sessions on behalf of an administrator.

Example Architectures

FIG. 1 illustrates a block diagram of an example computer system 100 that can facilitate predicting and deleting idle remote sessions in a distributed file system, in accordance with certain embodiments of this disclosure. Computer system 100 comprises client computer 102a, client computer 102b, and SMB server 104. In turn, SMB server 104 comprises idle session prediction component 106, and cluster 108. Client computer 102a and client computer 102b are communicatively coupled to SMB server 104 via communications network 110.

Figure 10:
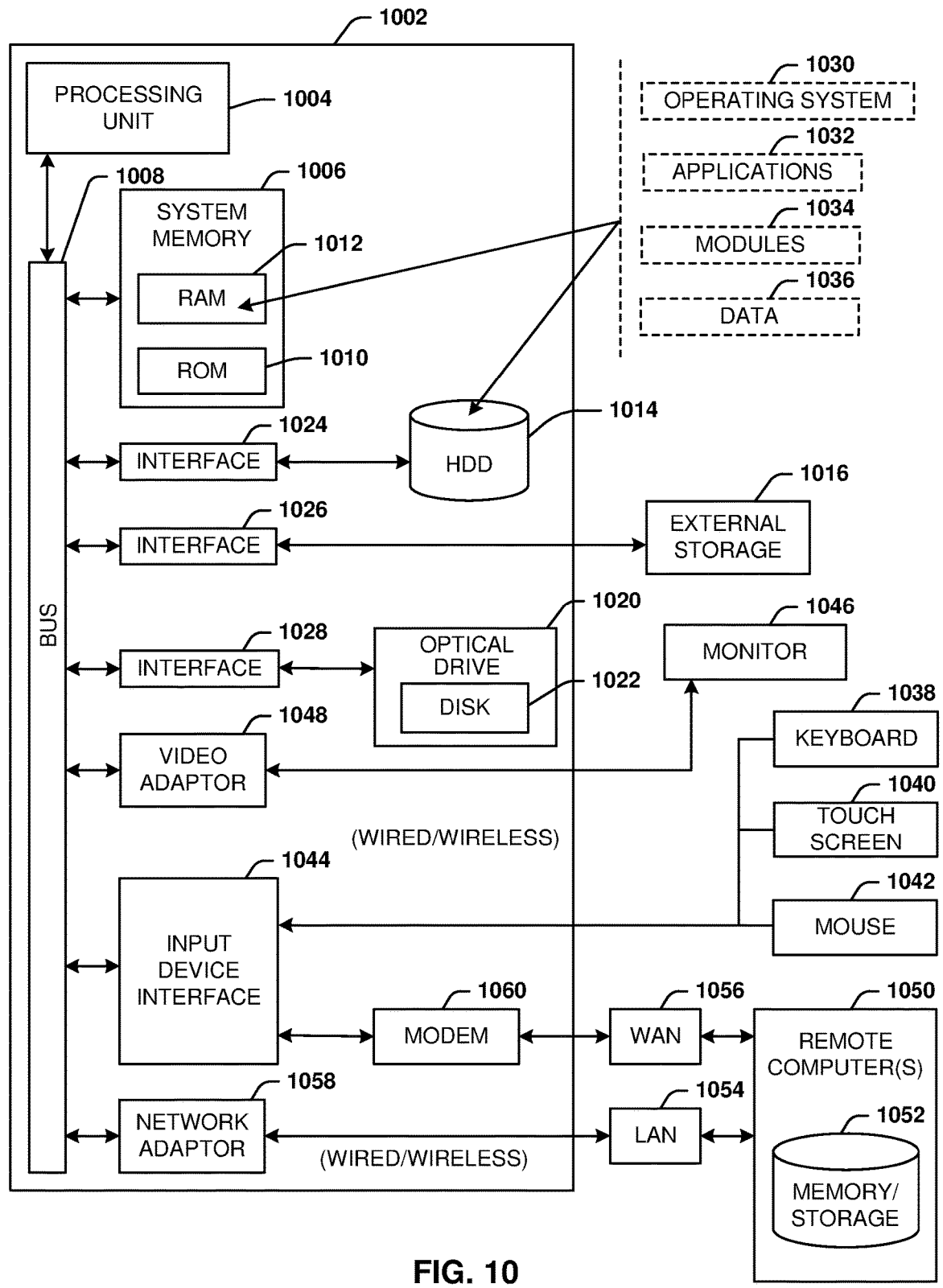
FIG. 10 illustrates an example block diagram of a computer operable to execute certain embodiments of this disclosure.

Each of client computer 102a, client computer 102b, and SMB server 104 can be implemented with aspects of one or more instances of computing environment 1000 of FIG. 10. Communications network 110 can comprise a computer communications network, such as the INTERNET.

Each of client 102a and client 102b can be configured to establish a remote session with SMB server 104. This remote session can comprise a SMB session. In examples where a remote session can be considered to have a client and a server as participants to the remote session, each of client 102a and client 102b can operate as a client to the remote session, and SMB server 104 can operate as a server to the remote session.

As depicted in computer system 100, client 102a has established a remote session with SMB server 104, and client 102b has established a separate remote session with SMB server 104. Each of client 102a and client 102b can utilize its respective remote session to access resources of SMB server 104. In some examples, each of client 102a and client 102b can access resources that are files stored on SMB server 104, such as to read, write, and/or modify those files. In some examples, accessing these resources can comprise obtaining a lock on the resource.

SMB server 104 comprises idle session prediction component 106. In some examples, idle session prediction component 106 can comprise a process that is hosted and executed by one or more computers of SMB server 104. Idle session prediction component 106 can be configured to facilitate identifying and deleting idle remote sessions in a distributed file system. More specifically, idle session prediction component 106 can be configured to predict that an administrator would close one or more SMB sessions that are idle, and proactively delete such a session.

Figure 7:
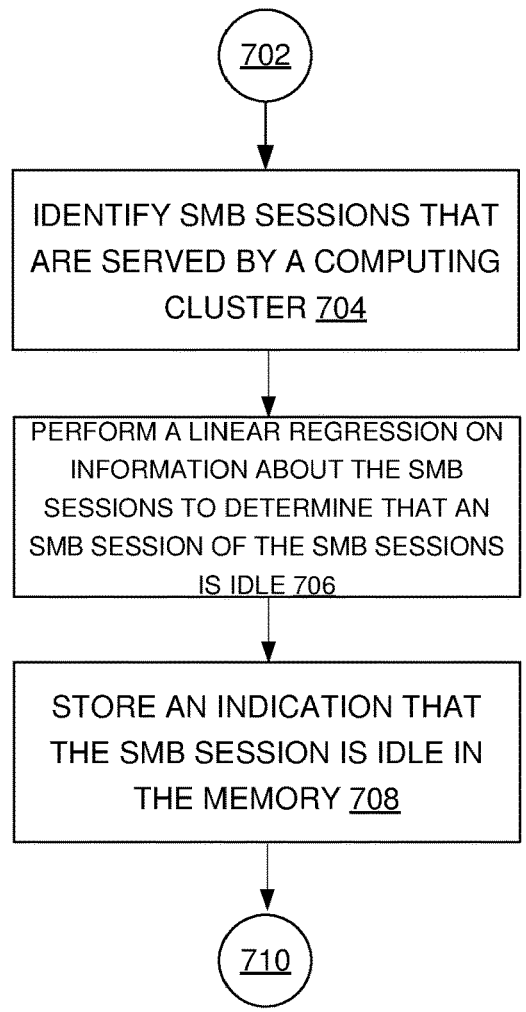
FIG. 7 illustrates an example process flow that can facilitate identifying and deleting idle remote sessions in a distributed file system, in accordance with certain embodiments of this disclosure.
Figure 8:
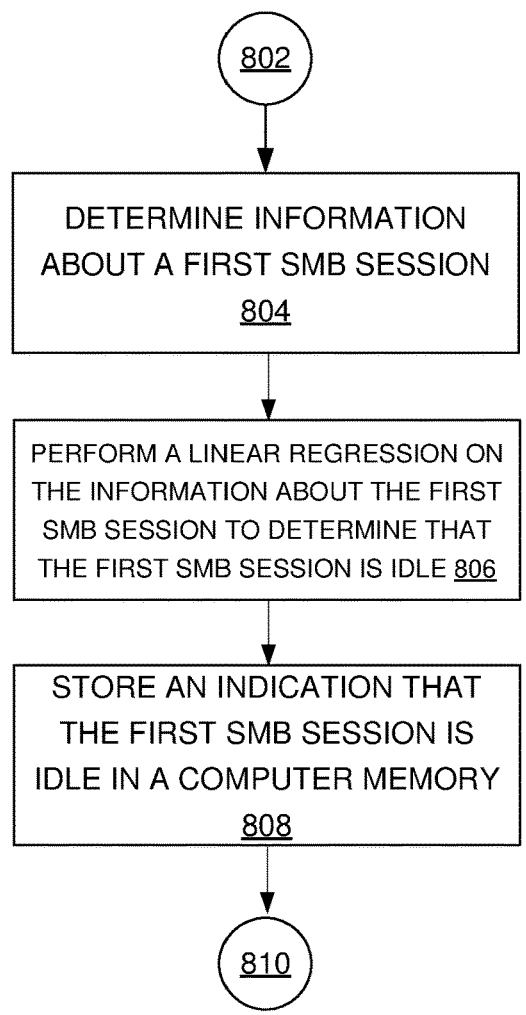
FIG. 8 illustrates another example process flow that can facilitate identifying and deleting idle remote sessions in a distributed file system, in accordance with certain embodiments of this disclosure.
Figure 9:
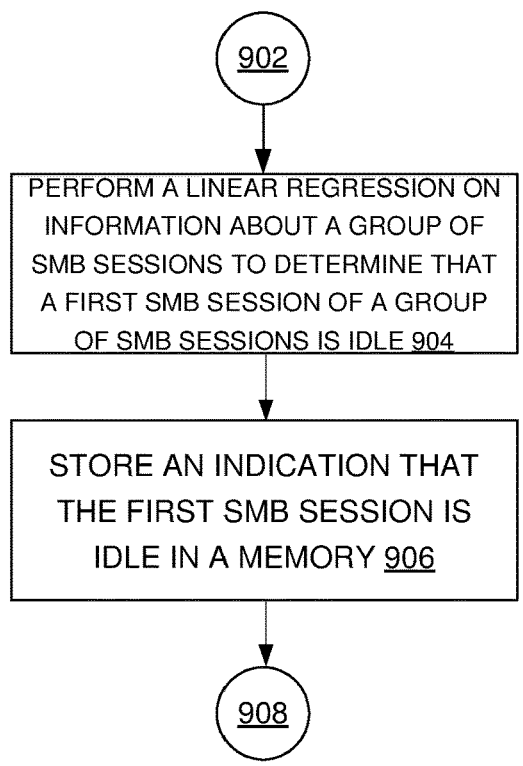
FIG. 9 illustrates another example process flow that can facilitate identifying and deleting idle remote sessions in a distributed file system, in accordance with certain embodiments of this disclosure.

To that end, idle session prediction component 106 can implement aspects of process flow 700 of FIG. 7, process flow 800 of FIG. 8, and/or process flow 900 of FIG. 9. In predicting that an administrator would delete an idle remote session, idle session prediction component 106 can perform linear regressions on data such as those described with respect to table 300 of FIG. 3, graph 400 of FIG. 4, and expression 500 of FIG. 5.

Idle session prediction component 106 can also create and/or provide aspects of user interface 600 of FIG. 6. For example, idle session prediction component 106 can create the information in these user interfaces and send that information to a remote computer that is accessible by an administrator of SMB server 104, so that the administrator can view the user interfaces and make decisions about idle sessions based on the information provided in those user interfaces.

SMB server 104 also comprises cluster 108. Cluster 108 can comprise a computer cluster made up of a plurality of computers, some of which can be referred to as computing nodes, or nodes. In some examples, each node of cluster 108 can be configured to serve a SMB session, such as to client 102a or client 102b.

Figure 2:
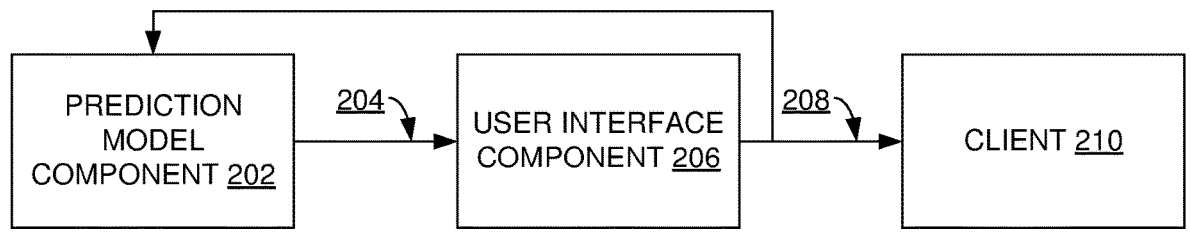
FIG. 2 illustrates another block diagram of an example computer system that can facilitate predicting and deleting idle remote sessions in a distributed file system, in accordance with certain embodiments of this disclosure.

FIG. 2 illustrates another block diagram of an example computer system 200 that can facilitate predicting and deleting idle remote sessions in a distributed file system, in accordance with certain embodiments of this disclosure. Computer system 200 comprises prediction model component 202, user interface component 206, and user action implementation component 210.

In some examples, one or more aspects of prediction model component 202, user interface component 206, and user action implementation component 210 can be implemented with aspects of one or more instances of computing environment 1000 of FIG. 10. In some examples, aspects of prediction model component 202 can be used to implement idle session prediction component 106 of FIG. 1. It can be appreciated that computer system 200 is depicted logically, and that there can be other implementations of the components described herein.

Prediction model component 202 can take as input information about both idle and active SMB sessions, as described herein. Prediction model component 202 can take this input and make a prediction that an administrator would delete one or more SMB sessions after is has been idle for a given amount of time, and whether they should be closed—either now, or at a future time. Prediction model component 202 can output 204 a list of SMB sessions, along with an indication of whether prediction model component 202 recommends closing a particular SMB session.

User interface component 206 can take the output 204 of prediction model component 202 as input, and generate and display a user interface that contains information about the SMB sessions analyzed by prediction model component 202 along with a recommendation about whether each one of them should be closed. User interface component 206 can receive user input at the user interface indicative of taking an action, such as closing a particular SMB session, or indicating that a particular SMB session should not be closed. User interface component 206 can output this user action 208.

This output user action 208 can be received by two components of computer system 200—prediction model component 202 and user action implementation component 210. Prediction model component 202 can receive and process the output user action 208, and use it to update its model and recommendation of which SMB sessions should be closed. User action implementation component 210 can also receive the output user action 208. User action implementation component 210 can effectuate the user action that was indicated at the user interface. For example, where the indicated user action is to close a particular SMB session, user action implementation component 210 can then close this particular SMB session.

Example Table

FIG. 3 illustrates a table 300 that can facilitate predicting and deleting idle remote sessions in a distributed file system, in accordance with certain embodiments of this disclosure. Table 300 and the data that it contains can be utilized by idle session prediction component 106 of FIG. 1 and/or prediction model component 202 of FIG. 2 in predicting and deleting idle remote sessions in a distributed file system. The data in table 300 can be graphed in graph 400 of FIG. 4, as described below.

Table 300 contains data for four idle sessions, along with a respective number of dependent sessions for each of the four sessions, and an idle time for each of the four sessions. Column 302 identifies a session; column 304 contains information about dependent sessions of the session identified in column 302; and column 306 identifies an idle time for the session identified in column 302.

There are also four rows—row 308a, row 308b, row 308c, and row 308d. Each row contains information about one session. Row 308a identifies a session with session ID 1, which has 1 dependent session, and has been idle for 20 minutes. Row 308b identifies a session with session ID 2, which has 2 dependent sessions, and has been idle for 10 minutes. Row 308c identifies a session with session ID 3, which has 4s dependent sessions, and has been idle for 5 minutes. Row 308d identifies a session with session ID 4, which has 5 dependent sessions, and has been idle for 25 minutes.

This information contained in table 300 can be graphed in graph 400 as part of being used to predict and delete idle sessions.

Example Graph

Figure 4:
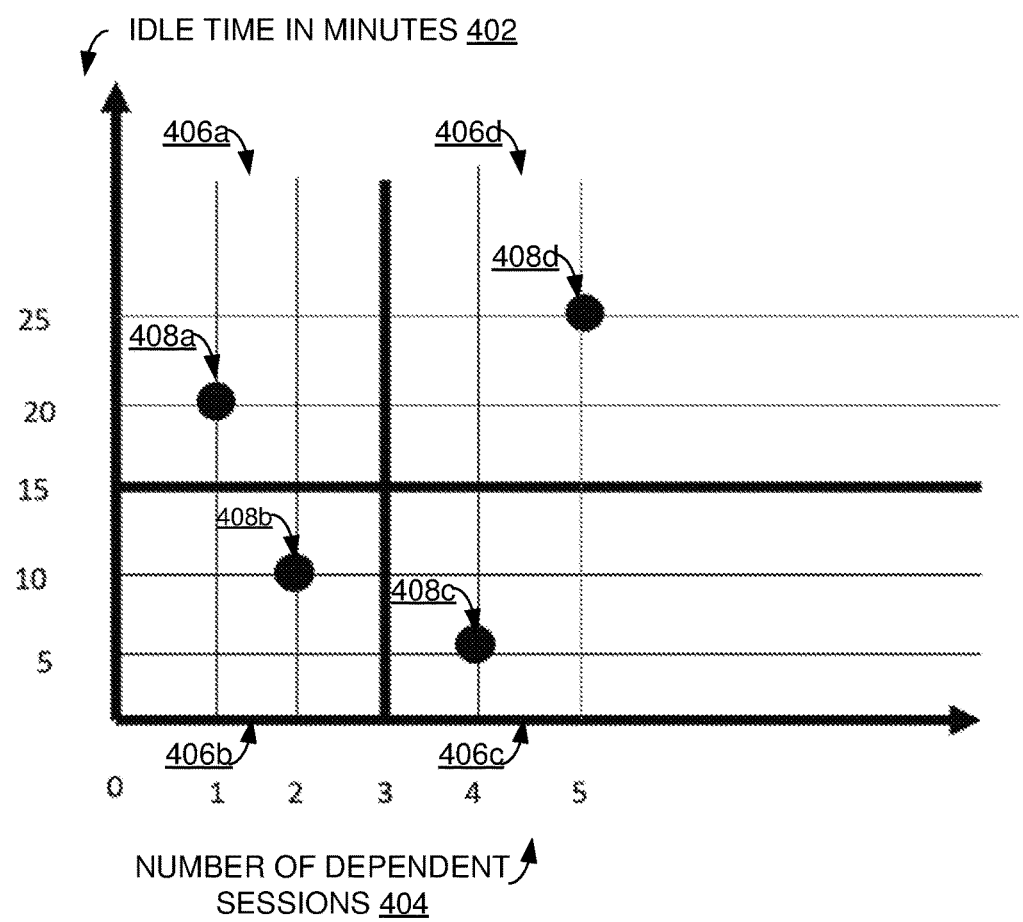
FIG. 4 illustrates a graph that can facilitate predicting and deleting idle remote sessions in a distributed file system, in accordance with certain embodiments of this disclosure.

FIG. 4 illustrates a graph 400 that can facilitate predicting and deleting idle remote sessions in a distributed file system, in accordance with certain embodiments of this disclosure. Graph 400 and the data that it contains can be utilized by idle session prediction component 106 of FIG. 1 and/or prediction model component 202 of FIG. 2 in predicting and deleting idle remote sessions in a distributed file system.

Graph 400 plots the information contained in table 300. For a given session, graph 400 plots the idle time (in minutes) on Y-axis 402, and the number of dependent sessions on X-axis 404. Graph 400 is divided into four quadrants—quadrant 406a, quadrant 406b, quadrant 406c, and quadrant 406d—and which quadrant a particular session is plotted in can be used to determine whether to delete that session. While the example of graph 400 illustrates dividing graph 400 into quadrants, it can be appreciated that there can be examples that divide a graph into more, or fewer, parts, and make a recommendation to close sessions based on that division.

Within quadrant 406a is data point 408a, which corresponds to the information in row 308a of FIG. 3. Within quadrant 406b is data point 408b, which corresponds to the information in row 308b of FIG. 3. Within quadrant 406c is data point 408c, which corresponds to the information in row 308c of FIG. 3. Within quadrant 406d is data point 408d, which corresponds to the information in row 308d of FIG. 3.

Then, a system that analyzes how an administrator chooses to close sessions (e.g., idle session prediction component 106 of FIG. 1 and/or prediction model component 202 of FIG. 2) can observe which quadrant the sessions that an administrator chooses to close are graphed in. The system can predict which sessions the administrator chooses to close in the future, and observe the administrator's actual behavior. The system can use the administrator's observed behavior to refine its predictions. In some examples, as the system makes more accurate predictions, the system can act on behalf of the administrator to close the sessions.

An example such as this can be divided into three steps. In the first step, the system can be in a learning, or training, phase. The system can determine a weight for each quadrant. Depending on which session the administrator closes, and which quadrant the session is in, the prediction model can adjust its weight for that component, such as to increase the chance that it will predict that a session in that quadrant will be closed.

In a second step, the system can start predicting the session that will be closed by the administrator. The system can refrain from closing the session itself, but can compare a decision taken by an administrator with a prediction the system makes about how the administrator will act.

In a third step, once the system is able to determine the quadrant from which the administrator is closing sessions, the system can then take action to close a session on behalf of an administrator.

As depicted, there are two variables used in predicting and closing idle sessions—a number of dependent sessions of the session and an idle time of the session. Depending on which variable the administrator weighs more, the system can predict the quadrant that holds the session that should be closed.

Example Expression

FIG. 5 illustrates an expression 500 that can facilitate predicting and deleting idle remote sessions in a distributed file system, in accordance with certain embodiments of this disclosure. Expression 500 can be used in table 300 of FIG. 3 to produce column 306 from the information presented in table 300, including row 308a, row 308b, and row 308c. Likewise, expression 500 can be used in graph 400 of FIG. 4 to produce line 406 from the information graphed in graph 400, including data point 408a, data point 408b, and data point 408c.

Expression 500 comprises element 502, element 504, element 506, element 508, and element 510. In the example of expression 500, there are n data points. For each data point, a difference between a predicted value for that data point (element 508) and an actual value for that data point (element 510) can be determined, and that difference can be squared. This squaring of a difference can be performed for each data point, and the results summed (element 506). This result can be multiplied by 1/n (element 504), and the result can be minimized Thus, in some examples, such a line for which the minimum value of expression 500 is determined can be used as a best-fit regression line.

Example User Interface

FIG. 6 illustrates an example user interface 600 that can facilitate predicting and deleting idle remote sessions in a distributed file system, in accordance with certain embodiments of this disclosure. In some examples, user interface 600 can be a user interface that is generated by user interface component 206 of FIG. 2. User interface 600 can contain a list of one or more SMB sessions that are active on a distributed file system, such as one effectuated by SMB server 104 of FIG. 1, as well as a recommendation about whether the session can be closed, such as produced by prediction model component 202 of FIG. 2.

As depicted, user interface 600 comprises two columns—session ID column 602 and close session column 604. Session ID column 602 identifies a session ID corresponding to a particular SMB session that is executing, such as on SMB server 104. Then, close session column 604 indicates whether it is recommended to close the SMB session, such as based on a prediction made by idle session prediction component 106 of FIG. 1.

User interface 600 also comprises three rows—row 606a, row 606b, and row 606c. Each row identifies a SMB session (in session ID column 602) and a recommendation of whether that session should be closed (in close session column 604). Row 606a concerns a session with session ID 1 and a recommendation that the session be closed. Row 606b concerns a session with session ID 2 and a recommendation that the session not be closed. Row 606a concerns a session with session ID 3 and a recommendation that the session not be closed.

User input can be received at user interface 600 to close a particular SMB session (e.g., the SMB session with session ID 1, as indicated in row 606a). A session can be deleted (sometimes referred to as being closed, or other terminology) in response to such user input (e.g., by user action implementation component 210 of FIG. 2). This user input can also be fed back into a prediction model (e.g., prediction model component 202 of FIG. 2), so that the prediction model can update its predictions regarding which SMB sessions should be deleted because an administrator would choose to delete them after a certain idle period.

Example Process Flows

FIG. 7 illustrates an example process flow 700 that can facilitate identifying and deleting idle remote sessions in a distributed file system, in accordance with certain embodiments of this disclosure. In some examples, aspects of process flow 700 can be implemented by idle session prediction component 106 of FIG. 1, or prediction model component 202 of FIG. 2. It can be appreciated that the operating procedures of process flow 700 are example operating procedures, and that there can be embodiments that implement more or fewer operating procedures than are depicted, or that implement the depicted operating procedures in a different order than as depicted.

Process flow 700 begins with 702, and then moves to operation 704. Operation 704 depicts identifying server message block (SMB) sessions that are served by a computing cluster. In some examples, a computing cluster (e.g., a SMB server 104 of FIG. 1) can maintain a list of SMB sessions that are being served by the computing cluster to one or more SMB clients (e.g., client computer 102a and client computer 102b of FIG. 1). In such examples, operation 704 can comprise accessing this list of SMB sessions to identify those SMB sessions that are being served by the computing cluster. After operation 704, process flow 700 moves to operation 706.

Operation 706 depicts performing a linear regression on information about the SMB sessions to determine that an SMB session of the SMB sessions is idle. This information about the SMB sessions can be maintained by a SMB server as it occurs, such as SMB server 104 of FIG. 1. For instance, when a SMB session that is served by SMB server 104 places a lock on a file, SMB server 104 can store an indication of that in a computer memory where it maintains an association between active locks and the SMB session that holds the lock. In other examples, the information about SMB sessions can be gathered by SMB server 104 at the time that operation 706 is performed. In such examples, SMB server 104 can enumerate the SMB sessions that it is serving, and query or otherwise analyze each SMB session for relevant information used in operation 706.

In some examples, operation 706 comprises determining that an administrator is likely to close the SMB session by a determined idle time with a confidence above a defined threshold. That is, a linear regression can be performed to determine that an administrator is likely to close a SMB session by the time it has become idle for at least a given amount of time. Put another way, what can be predicted is an idle time at which the administrator will close the session.

In some examples, the information about the SMB sessions comprises an active time for the SMB session. That is, information used in the linear regression can include an active time for one or more SMB sessions.

In some examples, the information about the first SMB session comprises an idle time for the first SMB session. That is, a SMB session can be considered to be either active or idle. A SMB session can be considered to be active when user actions are being performed via the SMB session, such as user actions indicated from client computer 102a or client computer 102b and directed to SMB server 104. A SMB session can be considered to be idle when no such user action has been indicated within a given amount of time—e.g., 300 seconds.

In some examples, the information about the first SMB session comprises a number of dependent SMB sessions of the first SMB session. A first SMB session can have a lock on a resource, such as a file. After the first SMB session acquired the lock on the resource, a second SMB session can request a lock on that resource. It can be that the second SMB session needs to wait for the first SMB session to release its lock on the resource, such as where the first SMB session has an exclusive lock on the resource, or the second SMB session has requested an exclusive lock on the resource.

In such a scenario—where the second SMB session is waiting on the first SMB session to release a lock on a particular resource—the second SMB session can be considered to be a dependent SMB session of the first SMB session. Then, a number of dependent SMB sessions of the first SMB session can be determined by counting all SMB sessions that are waiting for access to a resource that is locked by the first SMB session.

In some examples, a system, such as SMB server 104 of FIG. 1, can maintain a list of resources that are locked, resources for which a lock is requested, and their associated SMB session. Then, determining the number of dependent SMB sessions of the first SMB session can comprise—using the list of resources—determining the resources that are locked by the first SMB session, and then the requests for access to those resources from other SMB session.

In some examples, the total number of unique SMB sessions requesting a resource that the first SMB session has locked can be the number of dependent SMB sessions. In other examples, one SMB session can request access to multiple resources locked by the first SMB session (e.g., access to both a first file and a second file). In such examples, each request can be counted toward the dependent sessions, so one SMB session requesting two files locked by the first SMB session can be counted as two dependent sessions.

In some examples, the information about the first SMB session comprises a number of open files of the first SMB session. A first SMB session can open a file, such as to read from the file, write to the file, or modify the file. A list of files that each SMB session has opened can be maintained (such as by SMB server 104 of FIG. 1), and then counted to determine the number of open files of the SMB session.

In some examples, the information about the first SMB session comprises a type of a first lock held by the first SMB session. A lock can be exclusive, where no other SMB session can access the resource for which the first SMB session holds a lock. A lock can also be non-exclusive, which prevents another SMB session from acquiring an exclusive lock to that resource so long as a non-exclusive lock is being held for that resource. A list of files for which the first SMB session has locks, and the type of each lock, can be maintained (such as by SMB server 104 of FIG. 1), and then accessed to determine the type of a first lock held by the SMB session.

In some examples, the information about the first SMB session comprises a previous user action taken with regard to a plurality of SMB sessions comprising the first SMB session and a second SMB session. For example, a previous user action can be that an administrator chooses to close (or not close) a SMB session that is recommended to be closed, such as in user interface 600 of FIG. 6. This user action can be received via user input in the user interface. These user actions can be monitored relative to a plurality of SMB sessions (including the first SMB session and the second SMB session) and the information of these user actions can then be applied to a single SMB session (e.g., the first SMB session, or a third SMB session).

This previous user action can also be that an administrator generally closes SMB sessions that have been idle for at least 10 minutes, but generally does not close SMB sessions that have been idle for a shorter amount of time. There are various other user actions that can be used as information in determining a linear regression, such as whether an administrator does or not close a SMB session with a particular characteristic (e.g., number of open files, or type of lock held).

In some examples, the previous user action taken with regard to the plurality of SMB sessions comprises a time at which an administrator has indicated to close the second SMB session of the plurality of SMB sessions. This time can be a time since the SMB session began, or an amount of time that the SMB session has been idle.

In some examples, operation 706 comprises utilizing some of the information about the first SMB session and about a second SMB session of the group of SMB sessions to determine that the first SMB session is idle. That is, information about multiple SMB sessions can be applied to the first SMB session to predict that an administrator would choose to close the first SMB session after it has been idle for a given period of time.

After operation 706, process flow 700 moves to operation 708. Operation 708 depicts storing an indication that the SMB session is idle in the memory. This can be a computer memory of SMB server 104 of FIG. 1, and the indication can be accessed, for example, to generate user interface 600 of FIG. 6. In some examples, operation 708 includes closing the SMB session in response to the determining that the SMB session is idle.

In some examples, operation 708 comprises presenting an indication that the SMB session is idle in a user interface. This user interface can be user interface 600 of FIG. 6. In some examples, presenting the indication that the SMB session is idle in the user interface comprises displaying a session ID for the SMB session in the user interface. Each SMB session can have an associated session ID that identifies the session, and this session ID can be displayed in the user interface. In some examples, operation 708 comprises closing the SMB session in response to receiving user input directed to the user interface indicative of closing the SMB session. That is, a user can provide user input at the user interface indicative of closing a particular SMB session, and that SMB session can be closed in response to receiving this user input.

After operation 708, process flow 700 moves to 710, where process flow 700 ends.

FIG. 8 illustrates another example process flow 800 that can facilitate identifying and deleting idle remote sessions in a distributed file system, in accordance with certain embodiments of this disclosure. In some examples, aspects of process flow 800 can be implemented by idle session prediction component 106 of FIG. 1, or prediction model component 202 of FIG. 2. It can be appreciated that the operating procedures of process flow 800 are example operating procedures, and that there can be embodiments that implement more or fewer operating procedures than are depicted, or that implement the depicted operating procedures in a different order than as depicted.

Process flow 800 begins with 802, and then moves to operation 804. Operation 804 depicts determining information about a first server message block (SMB) session. In some examples, operation 804 can be implemented in a similar manner as operation 706 of FIG. 7. After operation 804, process flow 800 moves to operation 806.

Operation 806 depicts performing a linear regression on the information about the first SMB session to determine that the first SMB session is idle. In some examples, operation 804 can be implemented in a similar manner as operation 706 of FIG. 7. After operation 806, process flow 800 moves to operation 808.

Operation 808 depicts storing an indication that the first SMB session is idle in a computer memory. In some examples, operation 808 can be implemented in a similar manner as operation 708 of FIG. 7. After operation 808, process flow 800 moves to 810, where process flow 800 ends.

FIG. 9 illustrates another example process flow 900 that can facilitate identifying and deleting idle remote sessions in a distributed file system, in accordance with certain embodiments of this disclosure. In some examples, aspects of process flow 900 can be implemented by idle session prediction component 106 of FIG. 1, or prediction model component 202 of FIG. 2. It can be appreciated that the operating procedures of process flow 900 are example operating procedures, and that there can be embodiments that implement more or fewer operating procedures than are depicted, or that implement the depicted operating procedures in a different order than as depicted.

Process flow 900 begins with 902, and then moves to operation 904. Operation 904 depicts performing a linear regression on information about a group of server message block (SMB) sessions to determine that a first SMB session of a group of SMB sessions is idle. In some examples, operation 904 can be implemented in a similar manner as operation 706 of FIG. 7. After operation 904, process flow 900 moves to operation 906.

Operation 906 depicts storing an indication that the first SMB session is idle in a memory. In some examples, operation 904 can be implemented in a similar manner as operation 708 of FIG. 7.

After operation 906, process flow 900 moves to 908, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented. For example, aspects of computing environment 1000 can be used to implement aspects of client 102a, client 102b, and/or SMB server 104 of FIG. 1, and/or prediction model component 202, user interface component 206, and/or user action implementation component 210 of FIG. 2. In some examples, computing environment 1000 can implement aspects of the process flows of FIGS. 7-9 to facilitate predicting and deleting idle remote sessions in a distributed file system.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
in response to receiving first user action data indicative of listing idle server message block (SMB) sessions that are served by a computing cluster, performing, with a prediction model, a linear regression on information about the SMB sessions to determine idle SMB sessions of the SMB sessions;
providing identified SMB sessions in a user interface in a precedence order based on the linear regression, wherein the precedence order indicates a recommended order to close the identified SMB sessions;
in response to receiving second user action data from the user interface indicative of taking an action with respect to a SMB session of the identified SMB sessions, updating, with the prediction model, the linear regression to produce an updated linear regression; and
storing the updated linear regression for the prediction model in the memory.

2. The system of claim 1, wherein the performing the linear regression about the SMB sessions to determine the idle SMB sessions comprises:
determining that an administrator is likely to close the SMB session by a determined idle time with a confidence above a defined threshold.

3. The system of claim 1, wherein the operations further comprise:
closing the SMB session in response to the determining that the SMB session is idle.

4. The system of claim 1, wherein the operations further comprise:
presenting an indication that the SMB session is idle in the user interface.

5. The system of claim 4, wherein the operations further comprise:
closing the SMB session in response to receiving user input directed to the user interface indicative of closing the SMB session.

6. The system of claim 4, wherein the presenting the indication that the SMB session is idle in the user interface comprises:
displaying a session ID for the SMB session in the user interface.

7. The system of claim 1, wherein the information about the SMB sessions comprises an active time for the SMB session.

8. A method, comprising:
performing, by a system comprising a processor, a linear regression on information about a first server message block (SMB) session to determine that the first SMB session is idle;
providing a list of SMB sessions that comprises the first SMB session in a user interface, based on the linear regression;
in response to receiving user action data from the user interface indicative of taking an action with respect to the list of SMB sessions, updating the linear regression to produce an updated linear regression; and
storing, by the system, the updated linear regression in a computer memory.

9. The method of claim 8, wherein the information about the first SMB session comprises an idle time for the first SMB session.

10. The method of claim 8, wherein the information about the first SMB session comprises a number of dependent SMB sessions of the first SMB session.

11. The method of claim 8, wherein the information about the first SMB session comprises a number of open files of the first SMB session.

12. The method of claim 8, wherein the information about the first SMB session comprises a type of a first lock held by the first SMB session.

13. The method of claim 8, wherein the information about the first SMB session comprises a previous user action taken with regard to a plurality of SMB sessions comprising the first SMB session and a second SMB session.

14. The method of claim 13, wherein the previous user action taken with regard to the plurality of SMB sessions comprises a time at which an administrator has indicated to close the second SMB session of the plurality of SMB sessions.

15. A non-transitory computer-readable medium comprising instructions that, in response to execution, cause a system comprising a processor to perform operations, comprising:
performing a linear regression on information about a group of server message block (SMB) sessions to determine that a first SMB session of a group of SMB sessions is idle;
providing information about the group of SMB sessions in a user interface, based on the linear regression;
in response to receiving action data at the user interface indicative of an action to perform with respect to a first SMB session of the group of SMB sessions, updating the linear regression to produce an updated linear regression; and
storing the updated linear regression in a memory.

16. The non-transitory computer-readable medium of claim 15, wherein the operations further comprise:
utilizing some of the information about the first SMB session and about a second SMB session of the group of SMB sessions to determine that the first SMB session is idle.

17. The non-transitory computer-readable medium of claim 15, wherein the performing the linear regression about the group of SMB sessions to determine that the first SMB session is idle comprises:
determining that an administrator is likely to close the first SMB session by a determined idle time with a confidence above a predetermined threshold.

18. The non-transitory computer-readable medium of claim 15, wherein the operations further comprise:
closing the first SMB session in response to the performing the linear regression.

19. The non-transitory computer-readable medium of claim 15, wherein the operations further comprise:
presenting an indication that the first SMB session is idle in a computer user interface.

20. The non-transitory computer-readable medium of claim 19, wherein the operations further comprise:
closing the first SMB session in response to receiving user input directed to the computer user interface indicative of closing the first SMB session.

* * * * *